United States Patent

Trocciola et al.

[11] Patent Number: 5,976,373
[45] Date of Patent: Nov. 2, 1999

[54] REMOVAL OF HYDROGEN SULFIDE FROM ANAEROBIC DIGESTER GAS

[75] Inventors: John C. Trocciola, Glastonbury; Herbert C. Healy, Hebron; Roger R. LeSieur, Enfield, all of Conn.; Ronald J. Spiegel, Chapel Hill, N.C.

[73] Assignee: International Fuel Cells, LLC, South Windsor, Conn.

[21] Appl. No.: 09/292,154

[22] Filed: Apr. 15, 1999

Related U.S. Application Data

[62] Division of application No. 08/269,518, Jul. 1, 1994, Pat. No. 5,916,438.

[51] Int. Cl.[6] .............................. B01D 53/52; C02F 3/28
[52] U.S. Cl. .................. 210/603; 210/614; 210/631; 210/758; 210/916; 48/127.5; 95/12; 95/136
[58] Field of Search ................... 210/188, 603, 210/631, 614, 739, 758, 916; 95/8, 12, 116, 136, 235; 96/111, 115, 139; 48/127.5

[56] References Cited

U.S. PATENT DOCUMENTS

| | | | |
|---|---|---|---|
| 2,813,010 | 11/1957 | Hutchins | 95/136 |
| 4,435,192 | 3/1984 | Stewart | 95/12 |
| 4,440,551 | 4/1984 | Henning et al. | 95/136 |
| 4,491,522 | 1/1985 | Ishida et al. | 210/603 |
| 4,784,770 | 11/1988 | Nayno | 210/603 |
| 4,833,877 | 5/1989 | Ahlano et al. | 55/71 |
| 5,114,689 | 5/1992 | Nagii et al. | 95/136 |
| 5,154,734 | 10/1992 | Ying | 95/8 |
| 5,232,467 | 8/1993 | Child et al. | 48/127.5 |
| 5,306,476 | 4/1994 | Jalan et al. | 95/136 |
| 5,552,061 | 9/1996 | Smith et al. | 210/758 |

*Primary Examiner*—Christopher Upton
*Attorney, Agent, or Firm*—William W. Jones

[57] ABSTRACT

The effluent gas stream from anaerobic waste water treatment digesters is treated to remove trace amounts of hydrogen sulfide and other contaminants. The chemical equation involved relies on the reaction of hydrogen sulfide with oxygen to form water plus elemental sulfur. The removal system includes a variable control line for adding air to the effluent gas stream; a filter for removing solids, entrained liquids and bacteria from the oxygen-enriched gas stream; a blower for directing the filtered gas stream into a potassium promoted activated carbon bed wherein the above chemical reaction takes place; and sensors for measuring the content of oxygen and hydrogen sulfide at the entrance and exit of the activated carbon bed. When the hydrogen sulfide content of the exiting gas stream exceeds a predetermined level, the amount of air added to the gas stream is increased until the predetermined level of hydrogen sulfide is achieved in the exiting gas stream.

5 Claims, 1 Drawing Sheet

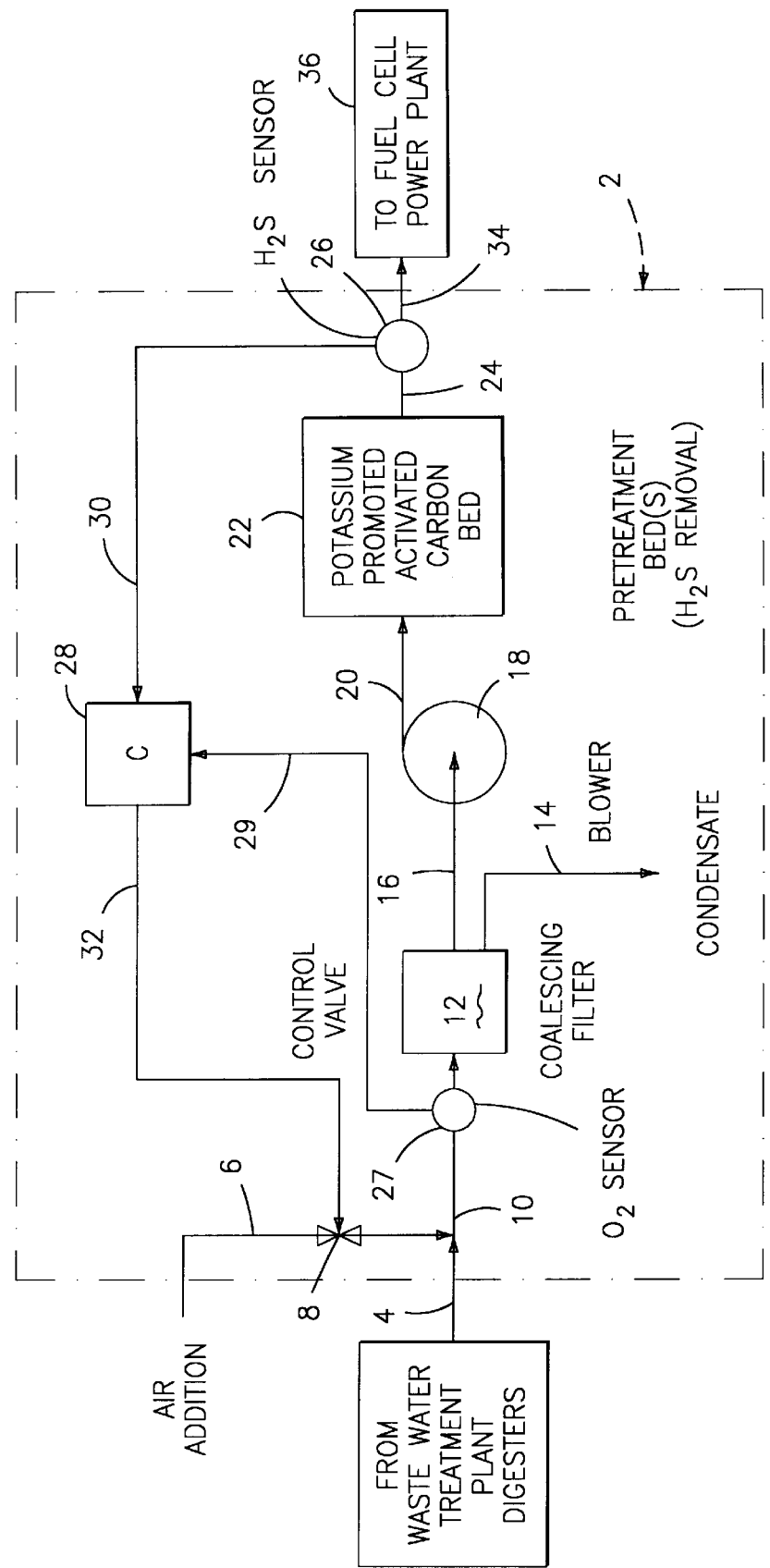

REMOVAL OF HYDROGEN SULFIDE FROM ANAEROBIC DIGESTER GAS

This is a division of U.S. Ser. No. 08/269,518, filed Jul. 1, 1994, now U.S. Pat. No. 5,916 438.

TECHNICAL FIELD

This invention relates to a process and system for the removal of hydrogen sulfide from an anaerobic digester effluent gas stream. More particularly, the invention relates to a process and system which can lower the hydrogen sulfide level in the digester effluent sufficiently to produce a gas stream which may be used as the fuel source in a fuel cell power plant or other energy-producing device.

BACKGROUND ART

Waste water treatment plants may include anaerobic bacterial digesters that are operable to assist in the purification of waste water, which digesters produce a gaseous effluent stream which contains methane, carbon dioxide, entrained water vapor, bacteria, and hydrogen sulfide traces. This effluent gas must be disposed of, and is presently commonly flared. This gaseous product of the digester is presently considered to be a nuisance at best, and a potentially environmental pollutant due to its carbon dioxide, methane and hydrogen sulfide constituents. This gas, however, has the potential to be put to useful purposes if certain of the contaminants, particularly the hydrogen sulfide, were removed therefrom. Hydrogen sulfide can be chemically removed from a gas stream via the Claus reaction ($H_2S + \frac{1}{2}O_2 \rightarrow H_2O + S$). This reaction cannot be sustained in an anaerobic digester effluent gas stream, however, due to the lack of sufficient oxygen in such a gas stream, since the digestion reaction takes place in an essentially oxygen-free environment in the digester. It would be desirable to devise a system which would readily allow the removal of digester gas contaminants so that the resultant gas stream could be put to a useful purpose, or cleanly disposed of.

DISCLOSURE OF THE INVENTION

This invention relates to a process and system which utilizes the aforesaid Claus reaction to remove hydrogen sulfide from the digester effluent gas stream. The invention involves the controlled addition of air to the digester gas stream prior to the sulfur removal. The air is added to the gas stream under pressure through an adjustable valve which can be selectively opened or throttled, as needed, to control the amount of air added to the gas stream. After the air is added to the gas stream, the gas stream passes through a coalescing filter wherein particulates, such as water droplets, entrained solids, and entrained bacteria are removed from the gas stream in a condensate which is returned to the digester. The filtered, oxygen enriched gas stream is then directed through a blower into a hydrogen sulfide removal bed. The $H_2S$ removal bed operates at ambient temperatures at gas velocities through the bed In the order of fifty to sixty feet per minute. The $H_2S$ removal bed may consist of an adsorbent activated carbon bed such as a potassium impregnated activated carbon adsorbent developed by Westates Carbon, Inc. of Los Angeles, Calif. The activated carbon is operable to adsorb the elemental sulfur formed as a result of the Claus reaction present in the gas stream. The gas stream entering the adsorption bed is monitored for oxygen content and the gas stream exiting the adsorption bed is monitored by a hydrogen sulfide sensor which senses the level of $H_2S$ in the exiting gas stream to ensure that there is less than about five parts per million $H_2S$ in the treated gas stream. When the $H_2S$ level exceeds the target level of 5 ppm, the $H_2S$ sensor signals a system microprocessor control which then increases the amount of air fed into the stream. This check and balance system operates continuously during operation of the system to ensure the maintenance of the desired $H_2S$ level in the treated gas stream. An example of a suitable $H_2S$ sensor is the model LD-17 hydrogen sulfide monitor produced by Interscan Corporation of Chatsworth, Calif. The treated gas stream is primarily carbon dioxide and methane (typically about 40% carbon dioxide and 60% methane) and is suitable for use as the hydrogen source for a fuel cell power plant. The treated gas could also be used as automotive fuel, boiler fuel, or could be flared (burned).

It is therefore an object of this invention to provide productively usable gas from the effluent gas stream emitted by an anaerobic digester waste water treatment plant.

It is a further object of this invention to provide a gas of the character described which is suitable for use as the fuel source in a fuel cell power plant.

It is an additional object of this invention to provide a gas of the character described which can be used as a fuel source for a combustion engine or for a steam boiler.

It is another object of this invention to provide a gas of the character described which is essentially free of hydrogen sulfide.

BRIEF DESCRIPTION OF THE DRAWING

These and other objects and advantages of the invention will become more readily apparent from the following detailed description of an embodiment of the invention when taken in conjunction with the accompanying drawing which is a schematic drawing of a system which operates in accordance with the invention to properly treat the digester effluent gas stream to render it usable as a fuel source for a fuel cell or other power plant.

BEST MODE FOR CARRYING OUT THE INVENTION

Referring now to the drawing, there is shown an anaerobic digester effluent gas stream treatment system denoted generally by the numeral 2, which receives the effluent gas stream from the digester via a line 4. A branch line 6 having an adjustable flow control valve 8 controls the flow of air into the effluent flow line 4. Oxygen enriched digester effluent gas is then carried in line 10 into a coalescing filter 12 which removes particulates, such as water droplets, bacteria and solids which may be entrained in the gas stream. The filtered materials are removed from the coalescing filter 12 by means of a drain line 14. The oxygenated, filtered gas stream is then fed through a line 16 into a blower 18 which forces the gas stream to flow through a line 20 into the hydrogen sulfide adsorption bed 22. The filtered, hydrogen sulfide-free gas stream passes from the adsorption bed 22 into a line 24 in which a hydrogen sulfide concentration monitor 26 is positioned to monitor and measure the level of hydrogen sulfide in the gas stream passing through the line 24. The $H_2S$ level in the line 24 is constantly converted to a signal by the monitor 26 which signal is transmitted to a system controller microprocessor 28 via line 30. The system may also include an $O_2$ sensor 27 which monitors the 02 level in the line 10 and signals the microprocessor 28 through line 29. The controller 28 is preprogrammed to analyze the $H_2S$ level signal from line 30 and the $O_2$ level from line 29, and to recognize when the $H_2S$ level in the line 24 exceeds a predetermined target value, preferably about 5 ppm. When the level of $H_2S$ sensed in the line 24 exceeds the target value, the controller 28 sends a signal through line 32 to the valve 8 which results in adjustment of the valve 8 which serves to admit sufficient air into the line 4 so as to provide sufficient oxygen into the line 4 to lower the $H_2S$ level in the line 24 to, or below, the target level. The treated gas stream then passes from the sensor 26 through line 34 into the fuel cell power plant 36, or other station which can effectively utilize the gas stream for productive power generation and/or other environmentally safe disposal.

It will be readily appreciated that the system and process of this invention can be utilized to assist in the generation of useful power by converting an essentially useless gaseous byproduct to a natural gas-like product that can be safely burned or can provide a source of hydrogen for a fuel cell power plant. The system utilizes readily available commercial products to form its component parts. The hydrogen sulfide adsorption bed is not regenerable in situ, and must be replaced with fresh activated carbon from time to time. The hydrogen sulfide adsorber can be comprised of dual beds connected in series and valved such that when the upstream bed gets loaded with sulfur, it can be remove without shutting the gas cleaning process down. This arrangement allows the upstream bed to become more fully loaded with sulfur before being removed because the downstream bed removes sulfur contaminants that have "broken through".

Since many changes and variations of the disclosed embodiment of the invention may be made without departing from the inventive concept, it is not intended to limit the invention otherwise than as required by the appended claims.

What is claimed is:

1. A method for treating an anaerobic digester effluent gas stream so as to render the same usable as a fuel gas for a fuel cell or other power plant, said method comprising the steps of:

a) adding oxygen to said effluent gas stream to form an oxygen-enriched gas stream;

b) removing entrained particulates including water, solids and bacteria from said oxygen-enriched gas stream to form particulate-free, oxygen-enriched gas stream; and c) removing hydrogen sulfide from said particulate-free, oxygen-enriched gas stream via the Claus reaction to form a hydrogen sulfide-free gas stream which is suitable for use as a fuel gas source in the power plant.

2. The method of claim 1 wherein the step of adding oxygen comprises adding air to said effluent gas stream through a variable air flow control valve.

3. The method of claim 2 further comprising the step of sensing the hydrogen sulfide level in said hydrogen sulfide-free gas stream and producing a signal which is indicative of the sensed hydrogen sulfide level.

4. The method of claim 3 further comprising the step of analyzing said signal and appropriately regulating said air flow control valve when the signal indicates an undesirable level of hydrogen sulfide in the gas stream.

5. The method of claim 1 further comprising the step of depositing elemental sulfur resulting from said hydrogen sulfide-removal on an activated carbon bed.

\* \* \* \* \*